(12) United States Patent
Barber

(10) Patent No.: US 7,053,796 B1
(45) Date of Patent: May 30, 2006

(54) MULTI-DIMENSIONAL INSTRUMENTS FOR MONITORING ENGINE AND SYSTEM PARAMETERS

(75) Inventor: Sarah Barber, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 504 days.

(21) Appl. No.: 10/375,659

(22) Filed: Feb. 27, 2003

(51) Int. Cl.
*G08B 21/00* (2006.01)

(52) U.S. Cl. ...................... 340/945; 340/971; 340/973; 340/691.6; 701/14

(58) Field of Classification Search ................ 340/945, 340/971, 973, 691.6; 701/14
See application file for complete search history.

(56) References Cited

U.S. PATENT DOCUMENTS

| | | | | |
|---|---|---|---|---|
| 4,930,519 A | * | 6/1990 | Anderson et al. ........... 600/484 |
| 5,420,582 A | * | 5/1995 | Kubbat et al. ............... 340/974 |
| 5,668,542 A | * | 9/1997 | Wright ........................ 340/971 |
| 5,886,649 A | * | 3/1999 | Francois ...................... 340/969 |
| 5,949,330 A | * | 9/1999 | Hoffman et al. ............ 340/438 |
| 5,986,580 A | * | 11/1999 | Permanne ................... 340/946 |
| 6,477,538 B1 | * | 11/2002 | Yaginuma et al. .......... 707/102 |

* cited by examiner

*Primary Examiner*—Daryl C Pope
(74) *Attorney, Agent, or Firm*—Nathan O. Jensen; Kyle Eppele

(57) ABSTRACT

A monitoring instrument that represents the state of n parameters is disclosed, where n is an integer greater than two. The monitoring instrument includes n axes having a common origination point. Each axis is configured to indicate one of the n parameters. The instrument also includes a polygon having n vertices, wherein each vertex is disposed along one of the n axes at a location indicating the state of the parameter indicated by said axis.

19 Claims, 7 Drawing Sheets

MULTI-DIMENSIONAL INSTRUMENTS FOR MONITORING ENGINE AND SYSTEM PARAMETERS

FIELD OF THE INVENTION

The invention relates to displays, and more particularly, to the display of engine and system parameters in, for example, an avionics display.

BACKGROUND OF THE INVENTION

Monitoring engine parameters and performance has always been one of the primary functions of a pilot of an aircraft. Indeed, the instruments displaying the engine parameters and performance are included as part of the instrument scan expected of pilots. In most turboprop or turbofan-powered airplanes, there can be six or more different engine instruments to be monitored. Enabling a pilot to quickly and efficiently scan and interpret these instruments is one of the major objectives for a flight deck designer or an instrument manufacturer.

FIG. 1 depicts a known type of analog instrument 10 that uses a pointer or needle 12 to indicate engine parameter values. The analog instrument may be an actual instrument, or as shown in FIG. 1 may be a "virtual" analog instrument digitally created from measured engine parameters. A principal advantage of an analog instrument is that the position of needle 12 can easily be interpreted, even during a rapid scan of the instruments. Because precise values cannot be easily read from analog scales, however, a scrolling numerical value 14 may be provided.

It may be possible to arrange the orientation of all the engine instruments such that, during a predetermined flight condition such as engine idle or cruising speed, the needles of all the analog instruments 10 are pointed in the same direction. This makes a quick check of overall engine performance very easy, even though all instruments have to be scanned in order. However, such an orientation is valid for only one flight condition. Once such flight condition changes, such as during take-off or approach, the needles will not be aligned in the same direction.

FIG. 2 shows variations of another known type of instrument called tape instruments 16. Tape instruments 16 provide a scalar graphic representation of a value of an engine parameter. Some tape instruments 16a include pointers 17 that move along an edge of a numbered and scaled 'tape' 18 to indicate parameter values. A numeric display 20 may also be included to provide additional display accuracy. Other tape instruments 16b do not simulate a scrolling effect and do not include numeric displays. Such instruments merely depict parameter values 22 relative to acceptable maxima 24 and minima 26. Although tape instruments may be superior to analog instruments 10 because of the potential to display more possible parameter values, it usually is not as easy to design the scaling of the different tape instruments such that all the parameter values line up on the tapes at a predetermined flight condition.

FIG. 3 shows a digital readout 28, which is another known method of displaying engine parameters. Digital readout 28 is useful for setting and reading exact parameter values. However, because each of the values must be read and interpreted before the overall condition of the engines can be comprehended, digital readouts are almost impossible to interpret during a rapid instrument scan. What is needed is a method of displaying engine parameters such that an operator accurately comprehends engine condition during a rapid instrument scan.

It is therefore an object of the invention to provide a display of parameters that can be easily read and interpreted during a rapid scan of the display.

It is another object of the invention to provide a display of parameters that incorporates the graphical advantages of analog and tape instruments.

It is yet another object of the invention to provide such a display to indicate values of aircraft engine parameters.

A feature of the invention is the combination of multiple parameters to create a two-dimensional geometric shape whose form is representative of the values of the parameters.

An advantage of the invention is that multiple parameters may be read and comprehended by referring to a single instrument or display.

SUMMARY OF THE INVENTION

The invention provides a monitoring instrument that represents the state of n parameters where n is an integer greater than two. The monitoring instrument includes n axes having a common origination point. Each axis is configured to indicate one of the n parameters. The instrument also includes a polygon having n vertices, wherein each vertex is disposed along one of the n axes at a location indicating the state of the parameter indicated by said axis.

The invention also provides an avionics monitoring instrument that graphically indicates values of n parameters relevant to operating an aircraft. The instrument includes a polygonal display area having a regular polygonal shape and n vertices. n axes emanate from a reference point centrally disposed within the polygonal display area. A measured value of each of the n parameters is displayed along a respective one of the n axes. A polygon is created by sequentially connecting the displayed value of each of the parameters such that vertices of the polygon are only disposed along the axes. The shape of the polygon is representative of the measured values of the n parameters.

The invention further provides a method of displaying, in a single display component, a plurality of parameters relevant to operating an aircraft. According to the method, a plurality of axes are emanating from a central point are displayed, with each axis configured to indicate a value of a respective one of the plurality of parameters. A polygon having vertices at the indicated values of the plurality of parameters is created within the display component. Each possible shape of the polygon indicates the values of the plurality of parameters.

DETAILED DESCRIPTION OF THE DRAWINGS

Figure 2:
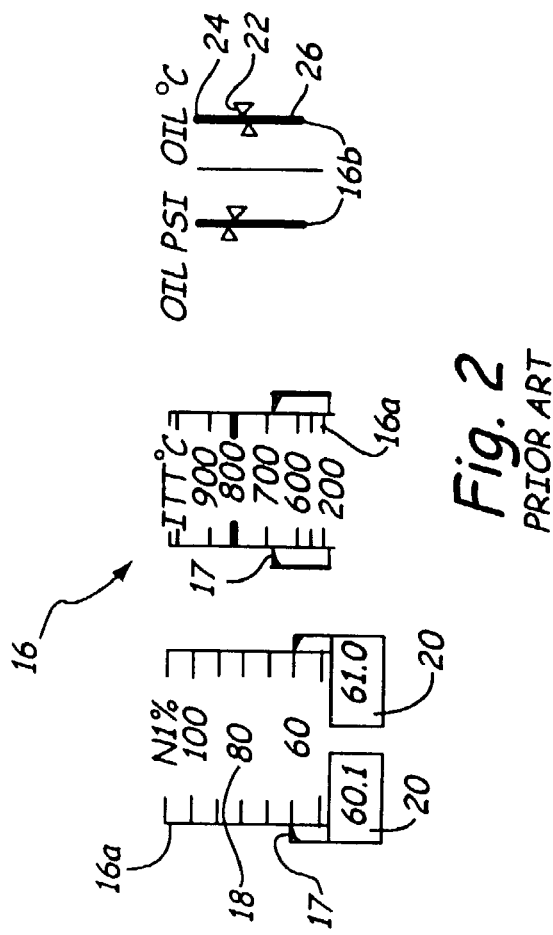
FIG. 2 shows a known type of tape instrument useful for monitoring aircraft engine parameters.
Figure 3:
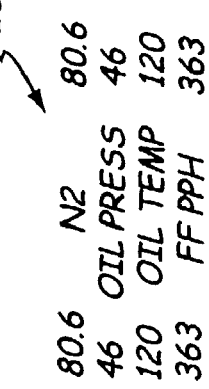
FIG. 3 shows a known type of digital readout useful for monitoring aircraft engine parameters.
Figure 1:
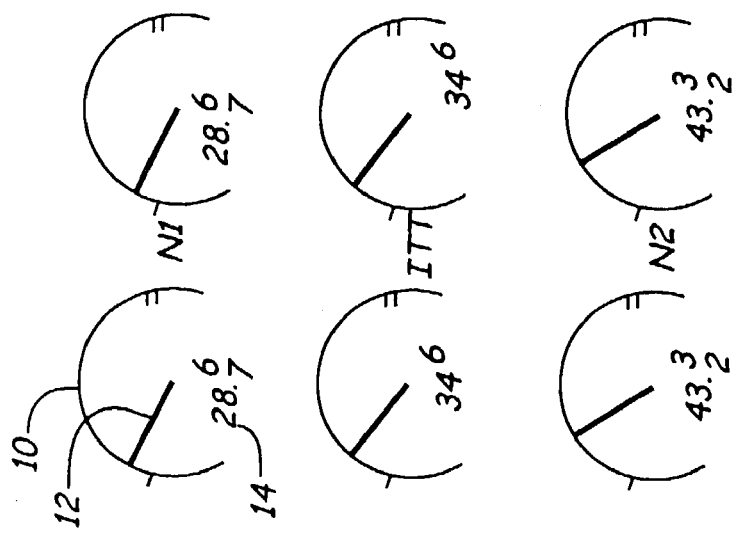
FIG. 1 shows a known type of analog instrument useful for monitoring aircraft engine parameters.
Figure 4:
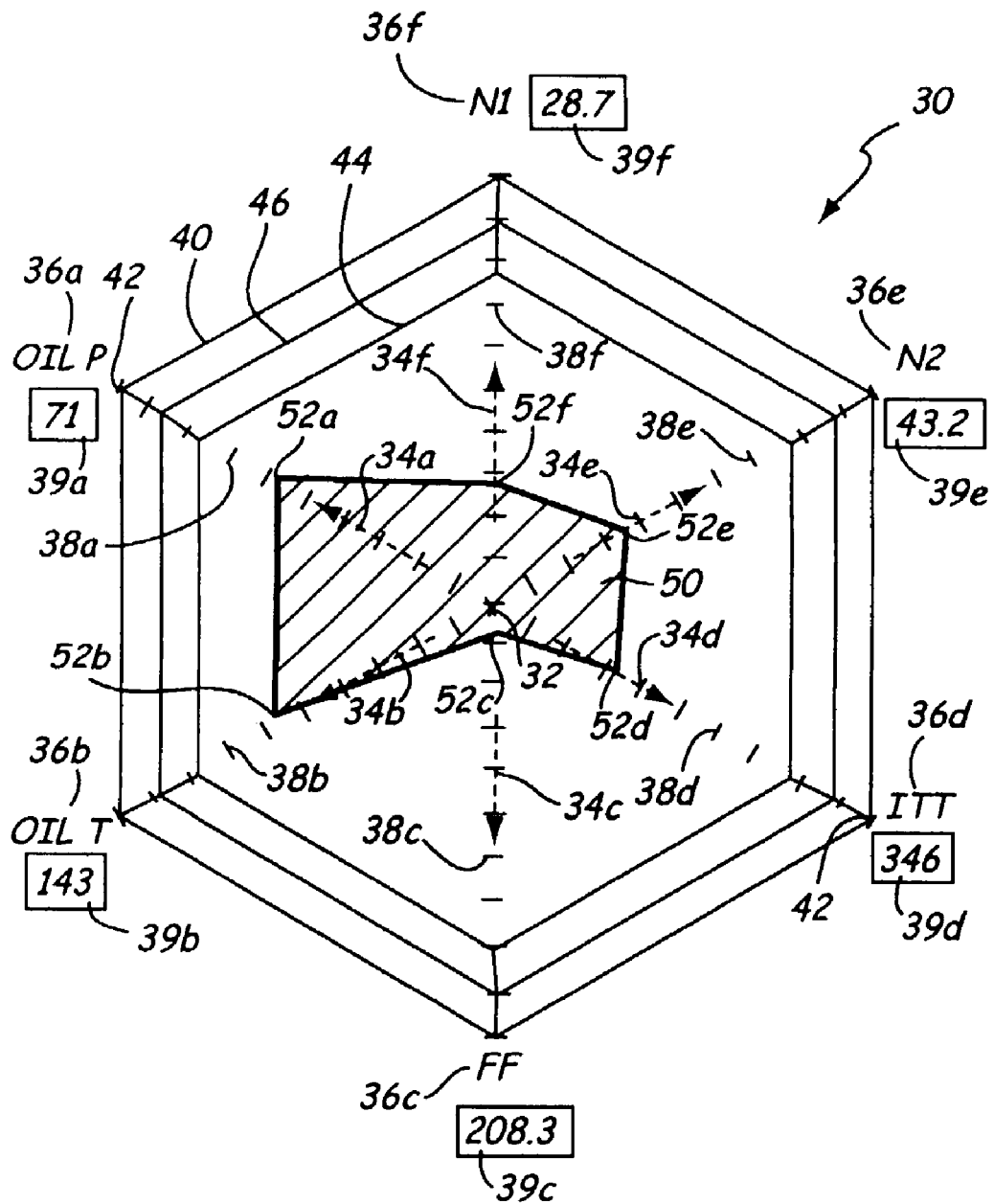
FIG. 4 is a view of a multi-dimensional or multi-directional monitoring instrument according to the invention.

FIG. 4 shows a multi-dimensional monitoring instrument 30 according to an embodiment of the invention. As depicted, instrument 30 is used to simultaneously monitor up to six parameters relevant to proper operation of an aircraft engine. As such, instrument 30 may be advantageously incorporated into an avionics display. Each parameter is measured along a unique axis or direction that originates at a central point 32. For instance, engine oil pressure is measured along axis 34a; oil temperature is measured along axis 34b; fuel flow is measured along axis 34c; inter-turbine temperature is measured along axis 34d; and turbine rotation speeds N1 and N2 are measured along axes 34e and 34f, respectively. Legends 36a–f are positioned such that a viewer knows what parameter is measured along each axis. Sets of graduated marks 38a–f along each axis enable a viewer to judge a relative value of a parameter. The units of measurement may of necessity be different for the different parameters, such as pounds per square inch for oil pressure and degrees Celsius for oil temperature. Likewise, each set of graduated marks is scaled such that maximum and minimum acceptable values for each parameter will be displayed on instrument 30. Numeric readouts 39a–f display exact values for each of the parameters.

Instrument 30 has an overall shape of a regular hexagon—in other words, all its sides are substantially equal and all its internal angles are substantially equal. Each set of graduated marks is positioned to extend to an outer border 40 of instrument 30, and specifically, to a vertex of the hexagon 42. Also included are a normal operation border 44 and an unusual condition border 46, both of which are concentric hexagons nested within outer border 40.

A state polygon 50 is disposed within instrument 30. Vertices 52a–f of state polygon 50 express the values of the parameters as measured along the respective axes. For example, as shown in FIG. 4, a value for oil pressure of 71 pounds per square inch is rendered as a vertex 52a along axis 34a and is centered on set of graduated marks 38a. A value for oil temperature of 143 degrees Celsius is rendered as a vertex 52b along axis 34b and is centered on set of graduated marks 38b. Values for the other parameters are likewise rendered. State polygon 50 is created by shading or otherwise highlighting the area 54 bounded by vertices 52a–f. In other words, state polygon 50 is created by drawing straight lines from vertices 52a–f rendered on adjacent sets of graduated marks 34a–f. By merely glancing at the shape of state polygon 50, a pilot can instantly determine whether the aircraft engine is properly running for a given flight condition. This significantly reduces the time required to perform a standard instrument scan.

Figure 5:
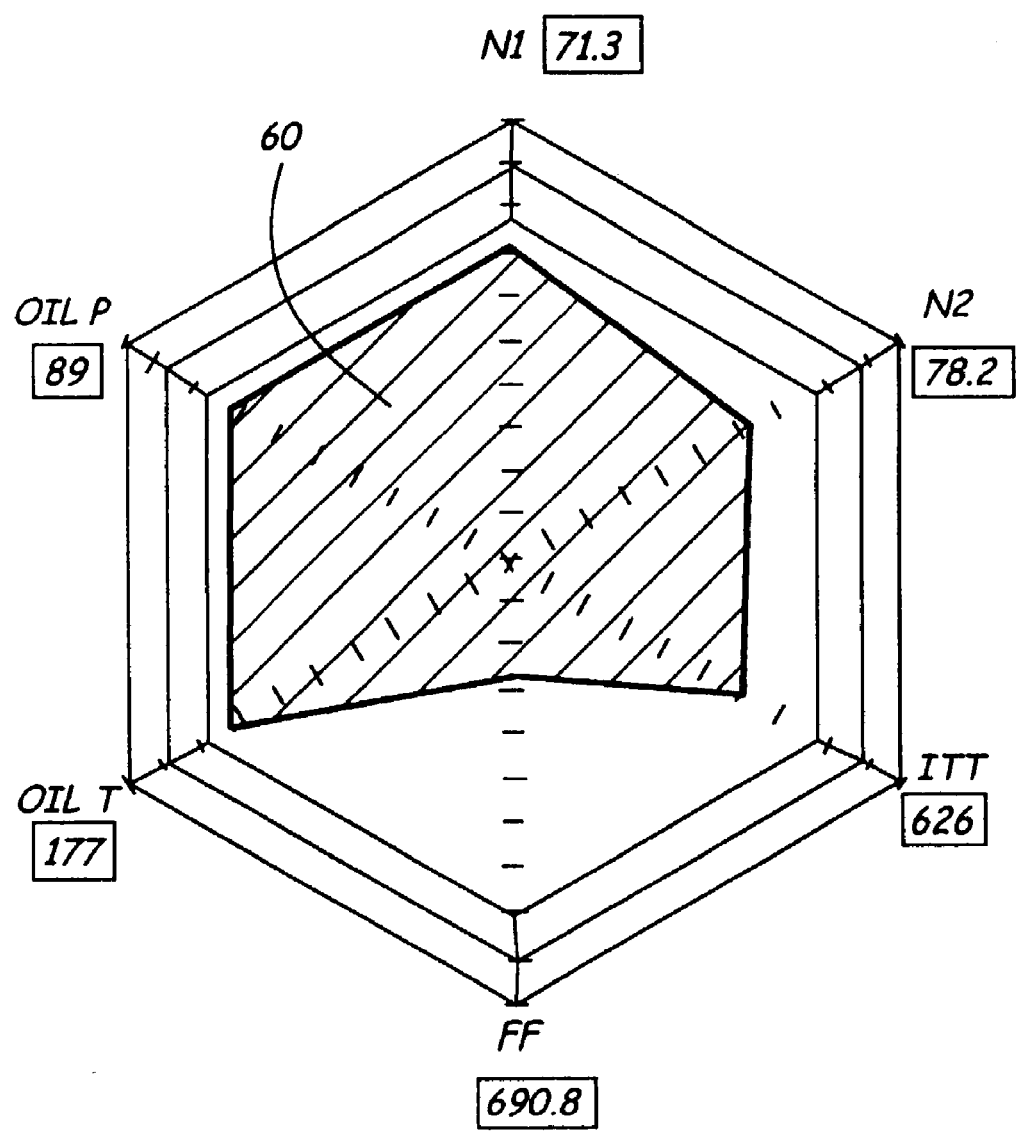
FIG. 5 is another view of a multi-dimensional or multi-directional monitoring instrument according to the invention.

As the engine parameters will be different for different flight conditions (e.g., take-off, landing, cruise speed, engine idle), the shape of state polygon 50 will necessarily be unique during normal engine operation during each respective flight condition. For example, state polygon 50 as shown in FIG. 4 represents normal engine operation when the aircraft engine is idling. In contrast, state polygon 60 in FIG. 5 represents normal engine operation when the aircraft is at cruising speed. As can be seen, the shapes of state polygons 50 and 60 are markedly different. If a pilot or other user is familiar with the possible shapes that the state polygon may take during normal operation for the various flight conditions, the pilot can easily and quickly determine and comprehend not only the values of the different parameters, but also whether the engine is properly functioning.

Figure 6:
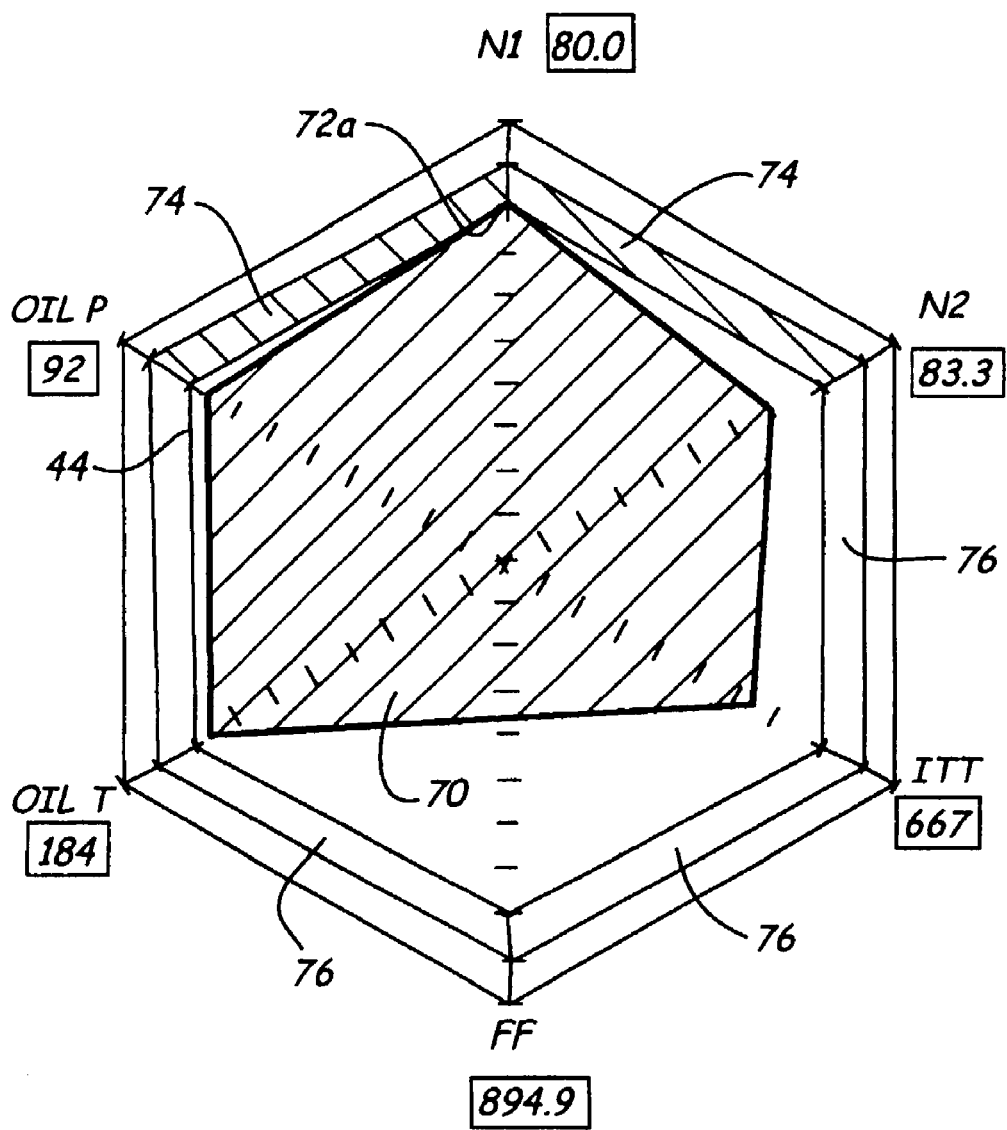
FIG. 6 is still another view of a multi-dimensional or multi-directional monitoring instrument according to the invention.

The invention can also provide a warning to the pilot or user if one or more of the parameters are not within a predetermined operating range. Each set of graduated marks is scaled such that the corresponding parameter values within a normal operating range are displayable within normal operation border 44. If, as shown in FIG. 6, a parameter value such as turbine speed N1 exceeds its predetermined normal operating range, the corresponding vertex 72a of state polygon 70 is rendered outside of normal operation border 44. Portions 74 of the area 76 between normal operation border 44 and unusual condition border 46 may be shaded a high-contrast warning color, such as red, amber, or yellow. To quickly alert the pilot to the out-of-bounds parameter, the portions of area 76 that are shaded may be those parts immediately adjacent vertex 72a, thereby simulating an arrow head pointing to the out-of-bounds parameter.

Figure 7:
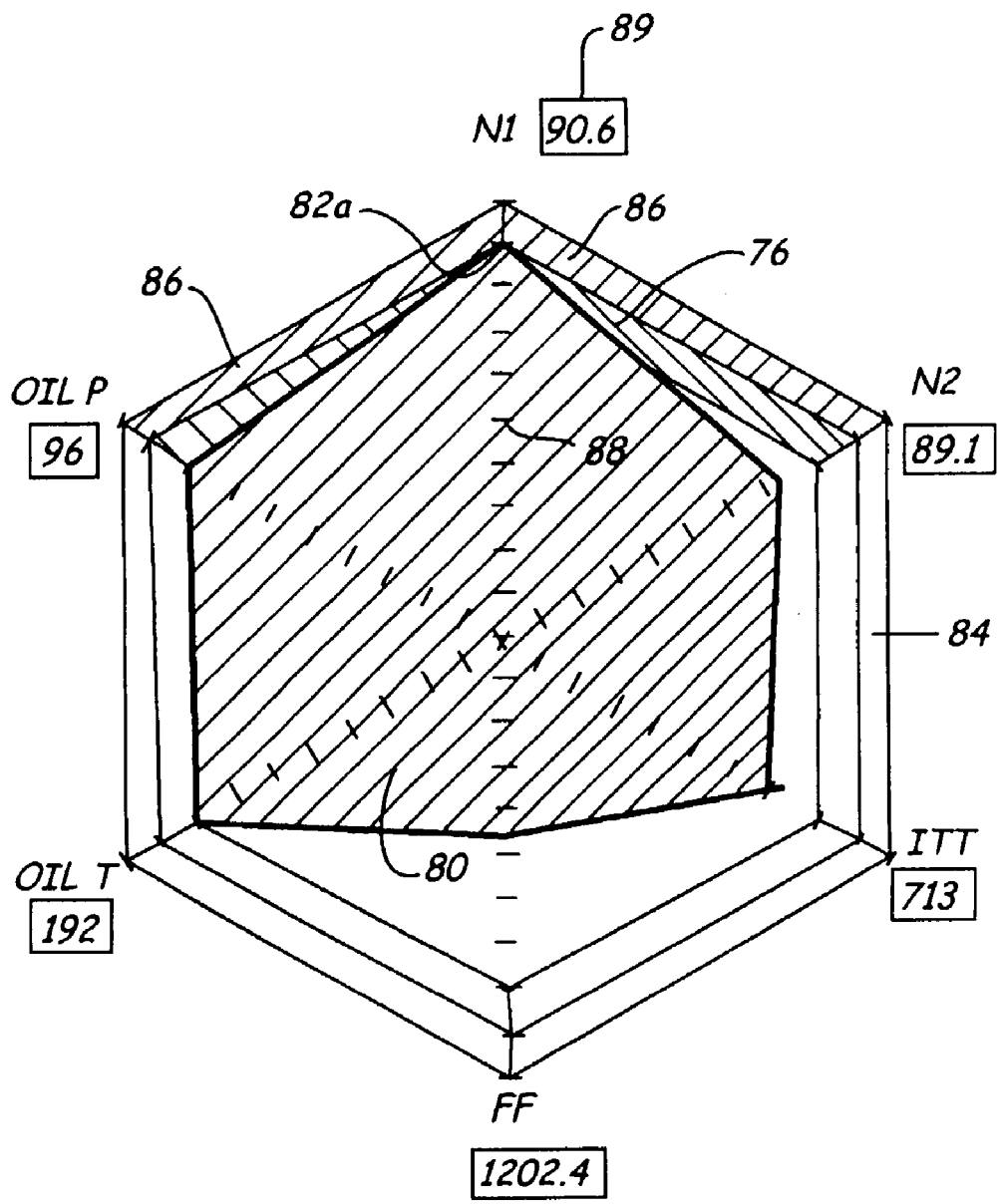
FIG. 7 is yet another view of a multi-dimensional or multi-directional monitoring instrument according to the invention.

A second level of warning may be provided if a parameter further exceeds its allowable operating range. As shown in FIG. 7, the value for turbine speed N1 exceeds the allowable operating range for that parameter. Vertex 82a is located in an area 84 between unusual condition border 44 and outer border 40, and this condition is representative of a dangerous condition that must be immediately corrected. Portions 86 of area 84 are shaded a high-contrast warning color, such as red, yellow or amber, but preferably different from the color used in area 76. Portions 86 of area 86 that are shaded may be those parts immediately adjacent vertex 82a, thereby simulating an arrow head pointing to the out-of-bounds parameter. To further accentuate the out-of-bounds parameter, the color of the graduated marks 88 corresponding to said parameter may be changed, preferably to the same warning color used in area 86 to indicate a dangerous condition. The color of the numeric readout 89 corresponding to the out-of-bounds parameter may be similarly changed.

Figure 8:
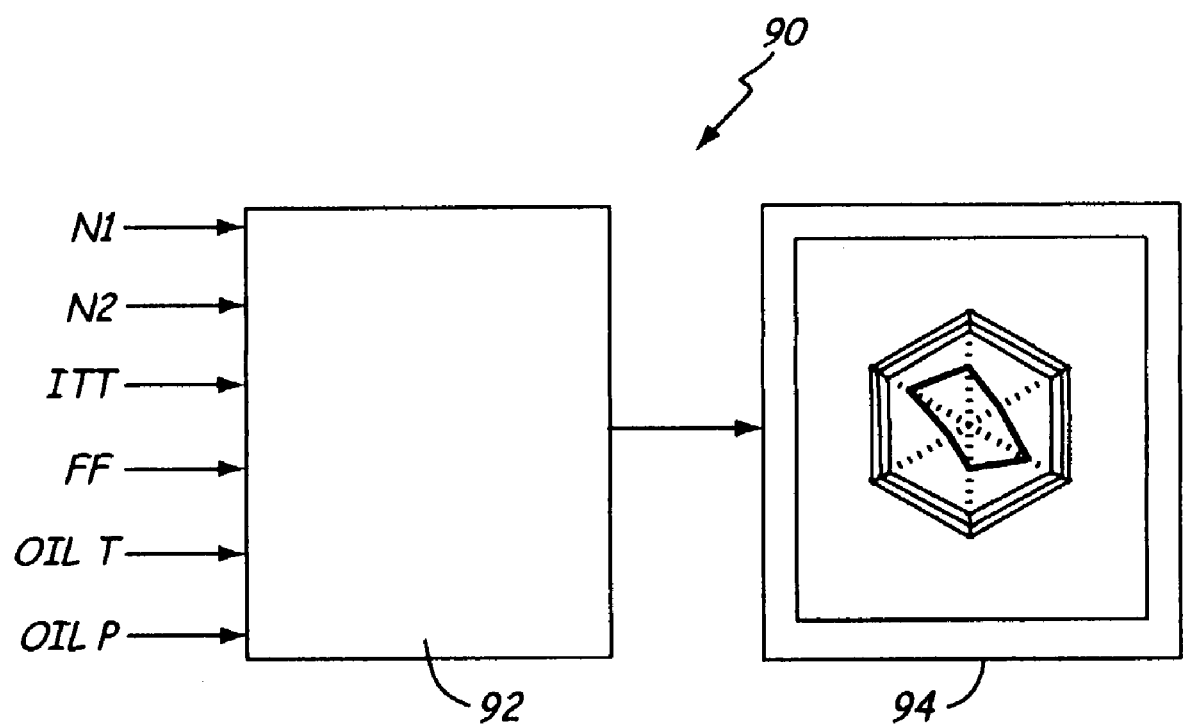
FIG. 8 is a schematic of a system according to the invention.

Instrument 30 may be created using a system 90 similar to that shown in FIG. 8. System 90 includes a processor 92 that receives inputs N1, N2, ITT, FF, OIL T, and OIL P from the respective sensors (not shown). The inputs may be analog or digital; if analog, an analog-to-digital converter (not shown) may be used to convert the analog signals to digital signals. Processor 92 converts the inputs to values understandable to a reader. This may be done if, for example, a parameter such as turbine speed is displayed as a percentage of maximum permissible turbine speed. Processor 92 determines the vertex location for each parameter along its respective axis. This may be accomplished by an algorithm that compares the value of the parameter with the predetermined acceptable maximum and minimum values for the parameter, determines whether the scale between the maximum and minimum values is linear or non-linear, and places the respective vertex at the proper position between the maximum and minimum value. The state polygon is then created by connecting the derived vertices of adjacent axes. The processor provides this information to a display 94, as well as digital data to update numeric readouts 39a–f. The processor also checks if any parameter value is beyond its respective allowable operating range, and commands display 94 to notify the viewer as has been previously explained.

Figure 9:
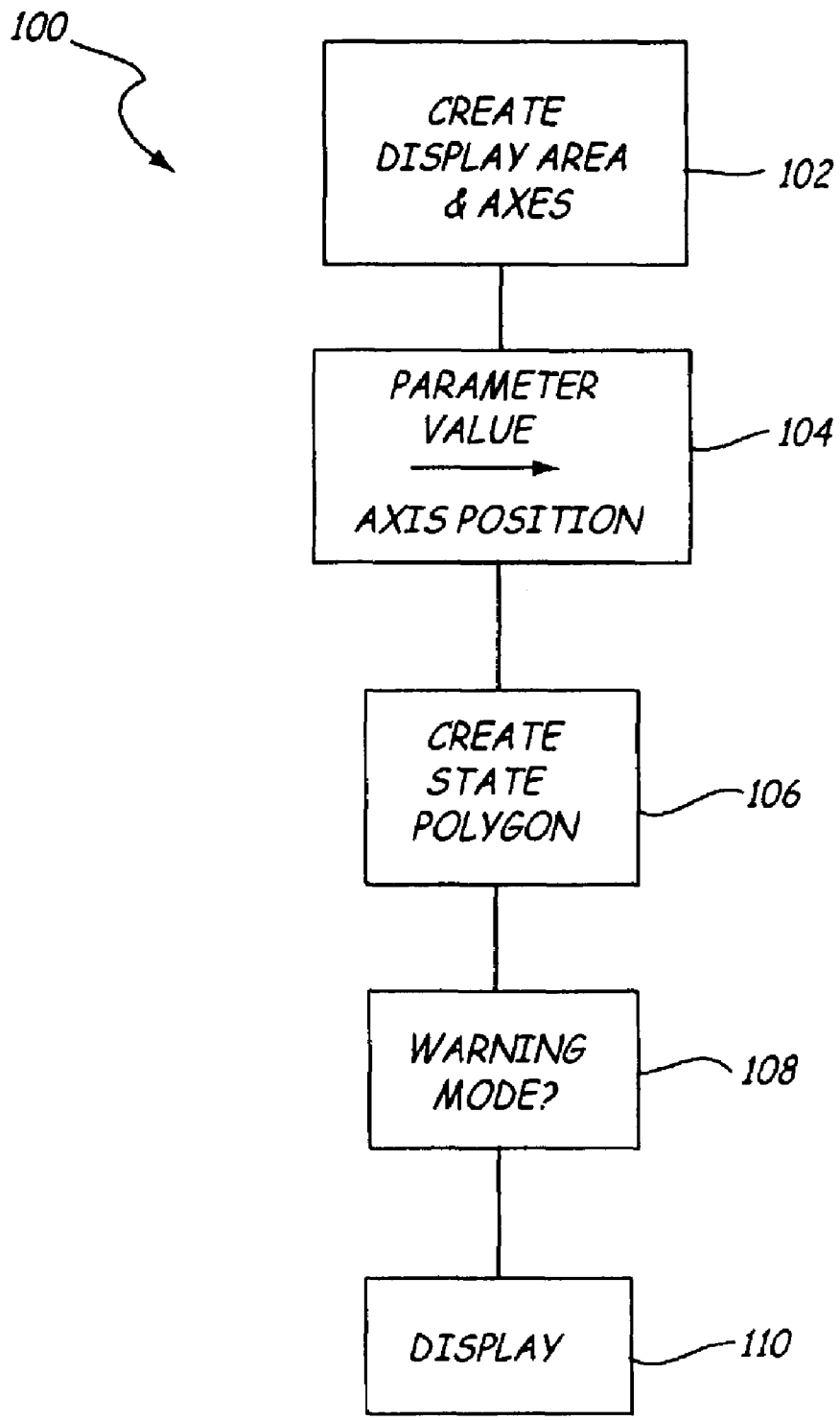
FIG. 9 is a flowchart showing a method according to the invention.

FIG. 9 is a flowchart that shows a method 100 of the present invention. Method 100 may be performed by a system such as system 90 as previously disclosed. According to method 100, in step 102 a polygonal display area is created, with a plurality of axes, each emanating from a central point within the polygonal display area and extending to a vertex of the polygonal display area. In step 104 the value of each parameter is converted to a position along the axis to which it is assigned. In step 106 a state polygon is created by treating the converted positions along each axis as points or vertices and connecting vertices of adjacent axes. In step 108 portions of the display are changed to a warning mode if one or more parameters are not within predetermined ranges. As previously discussed, this may be accomplished by changing colors of portions of the polygonal display area, the graduated marks along the axis upon which the parameter not within the predetermined range is displayed, and/or the numeric readout corresponding to said out-of-bounds parameter. In step 110 the polygonal display area and the state polygon are displayed on a display.

The invention may be varied in many ways while keeping with the spirit of the invention. For example, the Figures show area 76 and area 84 as being partially highlighted with a warning color only when one or more parameters exceed predetermined operating ranges. Alternatively, all of area 76 and area 84 may be constantly rendered in a warning color. For example, area 76 may be colored yellow and area 84 may be colored red. This would be consistent with generally accepted standards of yellow being a preliminary warning color to red.

The invention may also be varied by displaying parameters along at least three and as many as twenty axes or directions. However, it is expected that a pilot or user may not quickly comprehend the states of multiple parameters if too many parameters are displayed in a single instrument. The optimal number of parameters that may be displayed in the instrument of the present invention is between four and ten.

While the present embodiment has been described as an instrument to monitor the parameters relevant to operating an aircraft, the invention may be applied in any other application or technology where rapid comprehension of multiple variables or parameters is needed. Although the parameters measured in the above embodiments are relevant to proper operation of an aircraft engine, instrument 30 may easily be used to display and observe other parameters.

An advantage of the invention is that displaying multiple parameters as a two-dimensional geometric shape permits a pilot or other user to quickly scan a large number of parameter values with a single glance. By using shape recognition rather than numerical analysis, a pilot can quickly and easily determine normal, abnormal, and/or dangerous operating conditions.

Another advantage is that the different possible shapes of the state polygon enables the instrument to display multiple steady states. Instead of an analog display where the needles are aligned in only one engine state, the different shapes of the state polygon, once learned, provide simple visual/graphical expression for a plurality of engine states.

Still another advantage is that combining a plurality of parameters into a single instrument may reduce the display space that would otherwise be needed to display the parameters.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A component of an avionics display that represents the state of n parameters where n is an integer greater than two, comprising:

n axes having a common origination point, each axis configured to indicate one of the n parameters, said parameters being relevant to operating an aircraft; and a polygon having n vertices, wherein each vertex is disposed along one of the n axes at a location indicating the state of the parameter indicated by said axis.

2. The monitoring instrument of claim 1, wherein n is equal to six.

3. The monitoring instrument of claim 1, further comprising an angle between each of the n axes, wherein all such angles are substantially equal.

4. The monitoring instrument of claim 1, further including a numeric readout representing a current value of each of the n parameters located adjacent an end of a respective axis.

5. The monitoring instrument of claim 1, further including:

a polygonal display area having n vertices, each of said n vertices of the polygonal display area being aligned with one of the n axes.

6. The monitoring instrument of claim 5, further including a warning area that indicates whether one of the n parameters exceeds a predetermined operating range.

7. An avionics monitoring instrument that graphically indicates values of n parameters relevant to operating an aircraft, the instrument comprising:

a polygonal display area having a regular polygonal shape and n vertices;

n axes emanating from a reference point centrally disposed within the polygonal display area, wherein a measured value of each of the n parameters is displayed along a respective one of the n axes;

a polygon created by sequentially connecting the displayed value of each of the parameters such that vertices of the polygon are only disposed along the axes;

wherein the shape of the polygon is representative of the measured values of the n parameters.

8. The instrument of claim 7, wherein the polygonal display area includes a warning area that graphically alerts an operator if a parameter is not within a predetermined range.

9. The instrument of claim 8, wherein the warning area is configured to substantially surround the remainder of the polygonal display area, and further wherein a color associated with the warning area contrasts with a color associated with the polygon.

10. The instrument of claim 9, wherein the color of the warning area is one of yellow, red, and amber.

11. The instrument of claim 9, wherein only the portion of the warning area adjacent an axis of a displayed parameter is highlighted in the color associated with the warning area when said parameter is not within the predetermined range.

12. The instrument of claim 7, wherein each of the n axes is configured such that maximum and minimum acceptable values of the respective parameter are displayed in the instrument.

13. The monitoring instrument of claim 7, further including a numeric readout representing a current value of each of the n parameters located adjacent an end of a respective axis.

14. A method of displaying, in a single display component, a plurality of parameters relevant to operating an aircraft, comprising:
    displaying a plurality of axes emanating from a central point, each axis configured to indicate a value of a respective one of the plurality of parameters; and
    creating a polygon within the display component, the polygon having vertices at the indicated values of the plurality of parameters;
    wherein each possible shape of the polygon indicates the values of the plurality of parameters.

15. The method of claim 14, further including:
    displaying a polygonal display area, wherein each vertex of the polygonal display area is aligned with one of the plurality of axes.

16. The method of claim 14, further including:
    determining whether any of the parameters is not within a predetermined range; and
    providing a visual alert if any of the parameters is not within the predetermined range.

17. The method of claim 16, further including;
    displaying a polygonal display area, wherein each vertex of the polygonal display area is aligned with one of the plurality of axes;
    wherein the step of providing a visual alert is accomplished by highlighting a portion of the polygonal display area.

18. The method of claim 17, wherein the step of providing a visual alert is accomplished by highlighting a portion of the polygonal display area adjacent to the axis upon which a parameter not within the predetermined range is displayed.

19. The method of claim 18, wherein the step of highlighting is performed by coloring the portion of the polygonal display one of red, yellow, and amber.

* * * * *